United States Patent
Fludger (10) Patent No.: US 11,424,833 B2
(45) Date of Patent: *Aug. 23, 2022

(54) DIGITAL RESAMPLING METHOD AND APPARATUS

(71) Applicant: Cisco Technology, Inc., San Jose, CA (US)

(72) Inventor: Christopher R. Fludger, Nuremberg (DE)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/202,705

(22) Filed: Mar. 16, 2021

(65) Prior Publication Data
US 2021/0203420 A1    Jul. 1, 2021

Related U.S. Application Data

(63) Continuation of application No. 16/694,366, filed on Nov. 25, 2019, now Pat. No. 11,018,777.

(30) Foreign Application Priority Data

Nov. 26, 2018 (GB) ..................... 1819215

(51) Int. Cl.
  *H04B 1/00*    (2006.01)
  *H04B 10/61*   (2013.01)
(52) U.S. Cl.
  CPC ......... *H04B 10/612* (2013.01); *H04B 1/0017* (2013.01)

(58) Field of Classification Search
  CPC ...... H04B 10/612; H04B 1/0017; H04B 1/16; H04L 7/0029
  See application file for complete search history.

(56) References Cited

U.S. PATENT DOCUMENTS

| 6,785,349 B1 * | 8/2004 | Rosenlof ........... H04L 25/03159 |
| | | 375/260 |
| 11,018,777 B2 * | 5/2021 | Fludger ................ H04B 1/0017 |

(Continued)

FOREIGN PATENT DOCUMENTS

EP    2615769 A1    7/2013

OTHER PUBLICATIONS

Välimäki, Vesa, "Discrete-Time Modeling of Acoustic Tubes Using Fractional Delay Filters", Report 37, Dec. 1995, 191 pages.

(Continued)

*Primary Examiner* — Dzung D Tran
(74) *Attorney, Agent, or Firm* — Edell, Shapiro & Finnan, LLC (57) ABSTRACT

A method for digital resampling in a digital communications receiver is described. The method comprises selecting whole samples of a received input signal in the time domain and implementing sub-sample digital interpolation in the frequency domain. This amounts to performing the time shift of the interpolation process in the frequency domain. The method may be performed in conjunction with the operation of a polarisation recovery filter. A digital communications receiver is also provided the receiver being arranged to perform frequency domain sub-sample interpolation on an input data signal.

20 Claims, 9 Drawing Sheets

(56) References Cited

U.S. PATENT DOCUMENTS

2015/0243155 A1* 8/2015 Xiong ............... H04B 10/0795
398/135
2016/0329970 A1* 11/2016 Yao .................... H04B 10/6162
2018/0316482 A1 11/2018 Gudovskiy et al.

OTHER PUBLICATIONS

Meyr, Heinrich et al., "Digital communication receivers: Synchronization, Channel Estimation, and Signal Processing", ISBN 0-471-50275-8, Online ISBN 0-471-20057-3, Oct. 1997, pp. 1-141.
Meyr, Heinrich et al., "Digital communication receivers: Synchronization, Channel Estimation, and Signal Processing", ISBN 0-471-50275-8, Online ISBN 0-471-20057-3, Oct. 1997, pp. 142-284.
Meyr, Heinrich et al., "Digital communication receivers: Synchronization, Channel Estimation, and Signal Processing", ISBN 0-471-50275-8, Online ISBN 0-471-20057-3, Oct. 1997, pp. 285-426.
Meyr, Heinrich et al., "Digital communication receivers: Synchronization, Channel Estimation, and Signal Processing", ISBN 0-471-50275-8, Online ISBN 0-471-20057-3, Oct. 1997, pp. 427-568.
Meyr, Heinrich et al., "Digital communication receivers: Synchronization, Channel Estimation, and Signal Processing", ISBN 0-471-50275-8, Online ISBN 0-471-20057-3, Oct. 1997, 569-710 pages.
Meyr, Heinrich et al., "Digital communication receivers: Synchronization, Channel Estimation, and Signal Processing", ISBN 0-471-50275-8, Online ISBN 0-471-20057-3, Oct. 1997, pp. 711-848.
Combined Search and Examination report under sections 17 and 18(3), Application No. GB1819215.3, dated May 10, 2019, 6 pages.

* cited by examiner

DIGITAL RESAMPLING METHOD AND APPARATUS

PRIORITY CLAIM

This application is a continuation of U.S. application Ser. No. 16/694,366, filed Nov. 25, 2019, which claims priority to United Kingdom Patent Application No. 1819215.3, filed Nov. 26, 2018. The entirety of each of these applications is incorporated herein by reference.

TECHNICAL FIELD

The present disclosure relates generally to a method and apparatus for performing digital resampling in an optical communications system.

BACKGROUND

Modern optical communications systems now routinely employ coherent detection and digital signal processing in the transmission of data along optical signal paths between transmission and receiver devices. In such systems, information is encoded into the modulated amplitude, phase, and polarisation of an optical signal, achieving very high optical channel capacity compared with systems using, for example, on-off keying only. Optical signals comprise an X polarised component and a Y polarised component.

Quadrature amplitude modulation (QAM) is a modulation method in which the optical waveform transmitted through an optical channel comprises a combination of phase-shift keying (PSK) and amplitude-shift keying (ASK). Higher order QAM modulation schemes (64QAM or 128QAM) are becoming increasingly common as signal processing becomes more efficient and data rates increase. However, the faster data rates and increased spectral efficiency provided by the higher order modulation techniques are by their nature more susceptible to noise and interference.

Optical signals become distorted during their transmission along an optical signal path. In the case of optical fibres, imperfections in the surface of the fibre, or asymmetries in the cross-section of the fibre will cause dispersion in the polarisation mode (known as PMD) or polarisation dependent loss (PDL). Different path lengths inside the fibre will cause time related distortion effects. The material properties of the fibre can lead to chromatic dispersion (CD).

Polarisation mode dispersion (PMD) is a result of an optical pulse propagating through a fibre in two randomly coupled polarisation modes, and varies with optical frequency.

Signals are transmitted along an optical fibre with reference to a clock signal. The received signal will be subject to jitter and timing frequency uncertainty, and so clock recovery processing is used.

When processing a signal at a receiver device in a system employing QAM, digital resampling of the received input signal is often performed. Digital resampling uses interpolation filters to reconstruct a discrete representation the original signal at a new sample rate. Finite impulse response (FIR) filters may be used in order to remove jitter effects so as to accurately resample the signal. In order for a FIR filter to more effectively remove higher frequency jitter effects introduced in the transmission channel, so that the signal can be accurately re-created, a longer (or higher order) filter is used. FIR filters introduce delay and multiplication to the signal path in order to create the filtering effects. A longer filter leads therefore to more calculations on the signal per clock cycle, which increases both power demands and latency in the signal path.

A butterfly structure of FIR filters may be used when polarisation of a signal is in an unknown state.

As can be appreciated, the longer/higher order a filter, the more intense the calculation in operation. It may be generally stated that as the complexity of the modulation of a signal increases, so too does the complexity of re-creating the original signal at the receiver, and where computational complexity increases, so too do the power demands upon a system.

BRIEF DESCRIPTION OF THE DRAWINGS

Examples of the present disclosure will now be explained with reference to the accompanying drawings in which.

Throughout the description and the drawings, like reference numerals refer to like parts.

DESCRIPTION OF EXAMPLE EMBODIMENTS

Overview

A method for digital resampling in a digital communications receiver is described herein. The method comprises selecting whole samples of a received input signal in the time domain and implementing sub-sample digital interpolation in the frequency domain. This amounts to performing the time shift of the interpolation process in the frequency domain. The method may be performed in conjunction with the operation of a polarisation recovery filter. A digital communications receiver is also described herein, the receiver being arranged to perform frequency domain sub-sample interpolation on an input data signal. Optional features are set out in the appended dependent claims.

Example Embodiments

Figure 1:
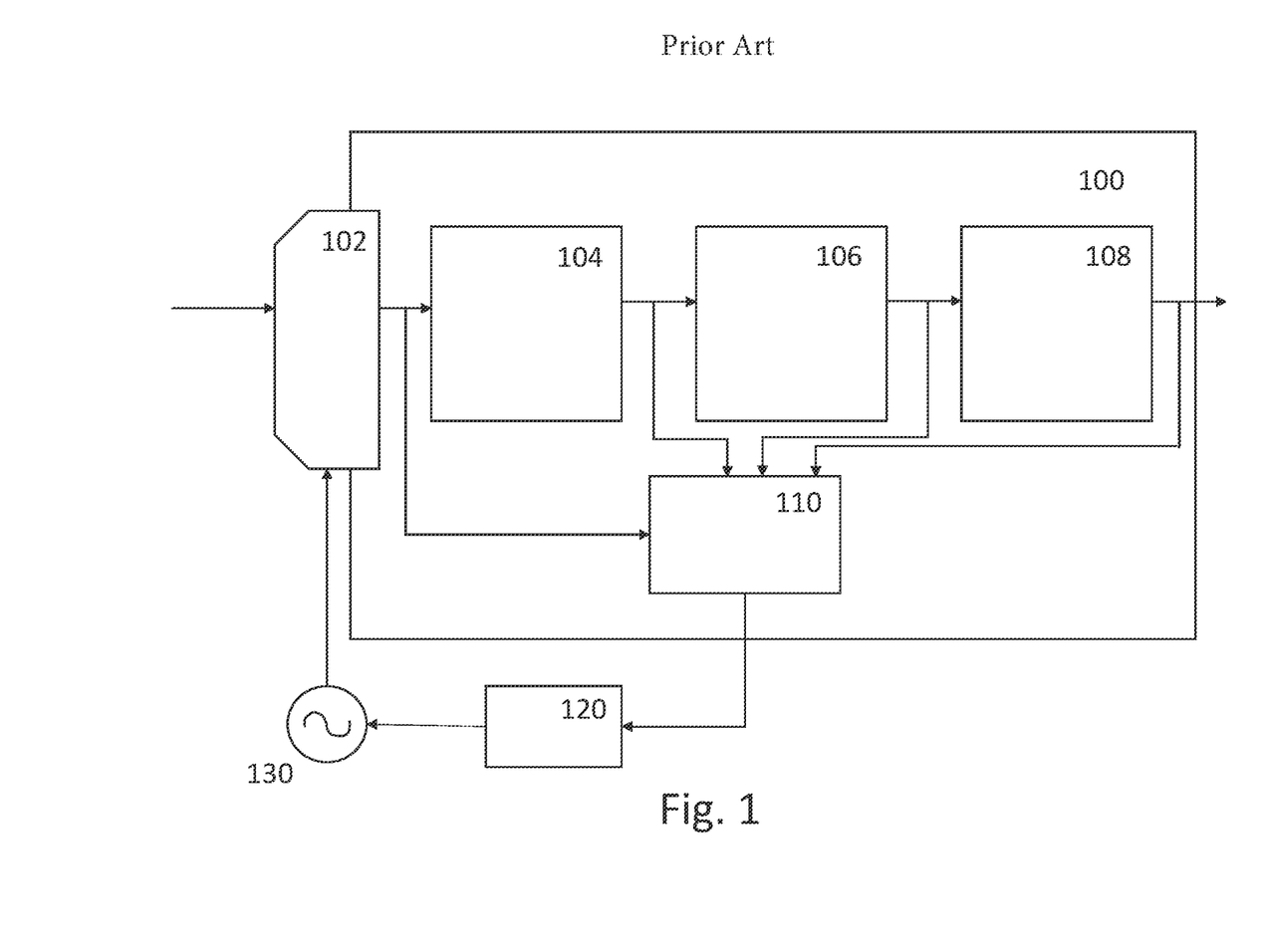
FIG. 1 is a block diagram of a prior art coherent optical communications receiver comprising means for clock recovery.

FIG. 1 is a block diagram of an example digital signal processor (DSP) module 100 of the prior art for use in an optical communications receiver modem (not shown). A modem receiving an optical signal comprises a transceiver for converting the signal to an electrical signal, and this is passed to an analogue-to-digital (ADC) converter, which takes the analogue data stream signal and outputs a discrete digital signal having a particular sample rate. The ADC output samples are affected by the distortions and noise introduced in the optical transmission system and so the signal is processed and resampled in order to recreate the original transmitted signal and eliminate data errors. The ADC 102 may comprise four distinct ADCs in the case of dual polarisation QAM, one each to treat the real and imaginary components of the X and Y polarisation components present in the received signal (XI, XQ, YI and YQ). The output of the ADCs may be passed to a chromatic dispersion (CD) equaliser module 104, which is arranged to treat CD. Once CD has been removed, the signal is passed to polarisation equaliser module 106, and subsequently to carrier recovery module 108.

Timing error detector 110 is provided to detect errors in the sample rate of the ADC with respect to the rate at which the signal was originally transmitted. Timing error detector 110 may receive as its input the outputs of ADC 102, CD equaliser module 104, polarisation equaliser module 106, and carrier recovery module 108. Timing error detector is arranged to feed back to a loop filter 120, which in turn controls a voltage controlled oscillator (VCO) 130. VCO 130 provides the reference clock signal to the ADC 102 which determines the nominal receive frequency based on the timing error determined by timing error detector 110. The feedback loop shown in FIG. 1 provides a way to adjust a sampling reference clock rate at the ADC so as to minimise sampling errors of the incoming digital signal.

If a timing error detector takes the output of the ADC 102 as its input, system latency in the DSP of FIG. 1 is clearly minimised, since the signal is received directly from the ADC without any further processing acting on the signal. However, the distortion and jitter still present in the signal at this point make control of the VCO 130 very difficult due to the level of distortion on the signal. It will be appreciated that as the CD equaliser module 104, polarisation equaliser module 106, and carrier recovery module 108 act on the input signal, the signal provided to the input of the timing error detector will be "cleaner" with respect to the distortion errors in turn. As more latency is introduced to the timing error detector 110 and VCO 130 signal path by the processing of the modules shown, the available loop filter 120 bandwidth is reduced, and therefore the ability to compensate for higher frequency jitter is reduced. When filtering jitter from a signal modulated using higher order modulation schemes, high accuracy is required, and so the longer the filter the better. However, as shown, there is a trade-off between quality of filtering and latency introduced into the signal path.

Low-power digital resampling capable of treating signals having higher order modulation, and therefore higher frequency jitter, is required.

Figure 2:
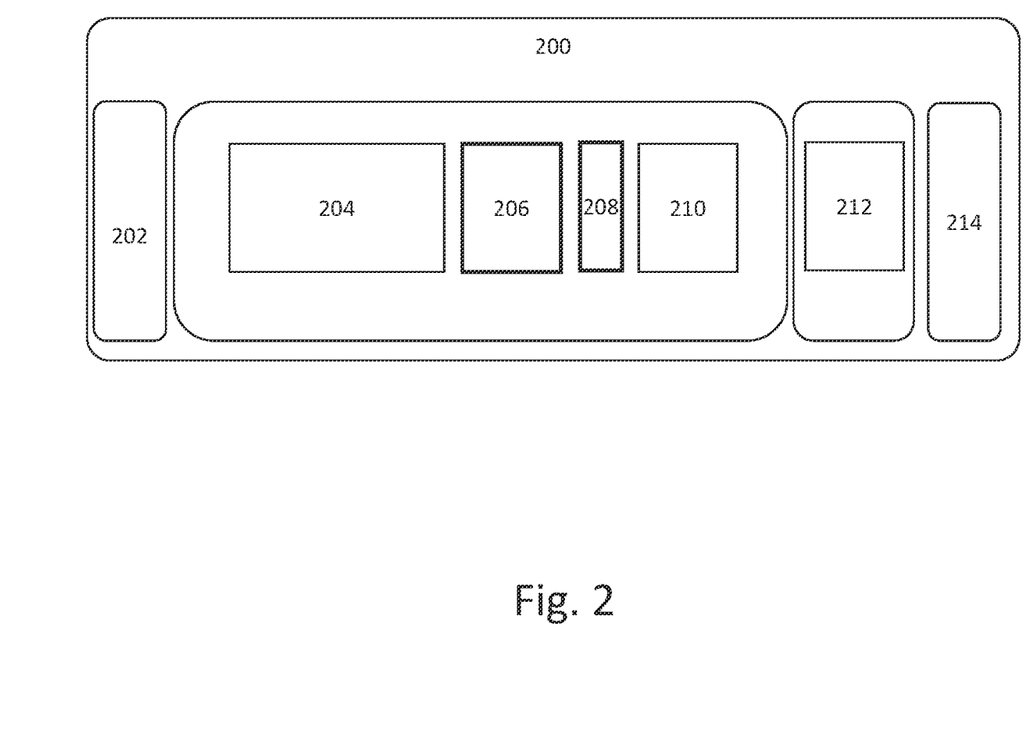
FIG. 2 is a block diagram of an optical communications receiver as described herein.

FIG. 2 shows a block diagram of an architecture of a DSP 200. DSP 200 comprises an ADC module 202, a signal preparation module 204, resampler module 206, and clock recovery module 208. ADC 202 is arranged to receive an input high speed data signal which may comprise dual-polarised (X, Y) signal data. Where dual polarised signal data is the input to the modem, input data is separated in two complex signals, one for the X polarization, and one for the Y polarisation. The complex valued signals can again be separated in two real-valued signals I and Q. (In phase and Quadrature component, often also called 0- and 90-degree component).

The signal processing module 204 prepares the digital samples for further processing. Signal scaling and chromatic dispersion compensation, among other functions, may be performed here.

The resampler module 206 performs fast jitter removal and frequency recovery for modest frequency offsets. Resampler module 206 also comprises a polarisation filter. The resampler module 206 is only able to introduce a timing phase shift, such that frequency offsets are compensated by changing the ADC clock frequency. The resampler module 206 also contains a digital phase-lock-loop (PLL) that uses a phase detector signal from clock recovery module 208 to track clock jitter. The control signals for the interpolation carried out in the resampler module 206 are derived from the clock recovery module.

Generic resampler function will now be described. Data is sampled at frequency $f_x$ by the ADC and put into a buffer. Data is also extracted by the interpolator at the rate $f_k$. Input and Output pointers are generated by a pointer calculator in clock recovery module 208, and are incremented at their respective rates. The output lags behind the input. Whilst the input pointer is an integer, the output pointer can be non-integer since interpolation will be performed in the resampler.

Mathematically we can describe the behaviour as follows. The data is regularly (frequency $f_x$) placed into the buffer at integer pointer $p_{in}$:

$$p_{in}(t) = \frac{t}{T_x}$$

Data is regularly (frequency $f_k$) extracted from the buffer at non-integer point $p_{out}$:

$$p_{out}(t) = \frac{t}{T_k} - L$$

where L is the time lag in the buffer to ensure that input and output pointers do not collide. At any output index k, the output index is reading from pointer:

$$p_{out} = \gamma k$$

and the input index is writing (synchronously or asynchronously) to pointer $$p_{in} = x = \lfloor \gamma k \rfloor + L$$

where $\gamma$ is the ratio between input and output sample rates.

Resampling is significantly simplified when the input and output sample rates are almost identical. Here $\gamma$ has the value≈1.0. In the following selections, the ratio $\gamma$ is replaced by the error signal $\beta = \gamma - 1$.

Note that we are referring to sample rates rather than clock rates. The ratio $\gamma$ is independent upon the degree of parallelism at the input and output. The clock rates are managed so that input and output pointers do not collide. This is a separate task handled by a Pointer Difference Calculator (not shown).

The clock recovery module 208 comprises a phase detector which controls the resampler module 206 via a digital loop filter. A pointer calculator and VCO loop-filter are used to control the ADC reference clock.

Control signals (integer and fractional pointers) are generated in the clock recovery module 208 and used to control the resampler module. Further function of modules 206 and 208 will be described in detail below.

DSP 200 may further comprise carrier phase estimation module 210 and forward error correction module 212, which provide the signal to serialiser/deserialiser 214 for subsequent onward electrical transmission.

Figure 3:
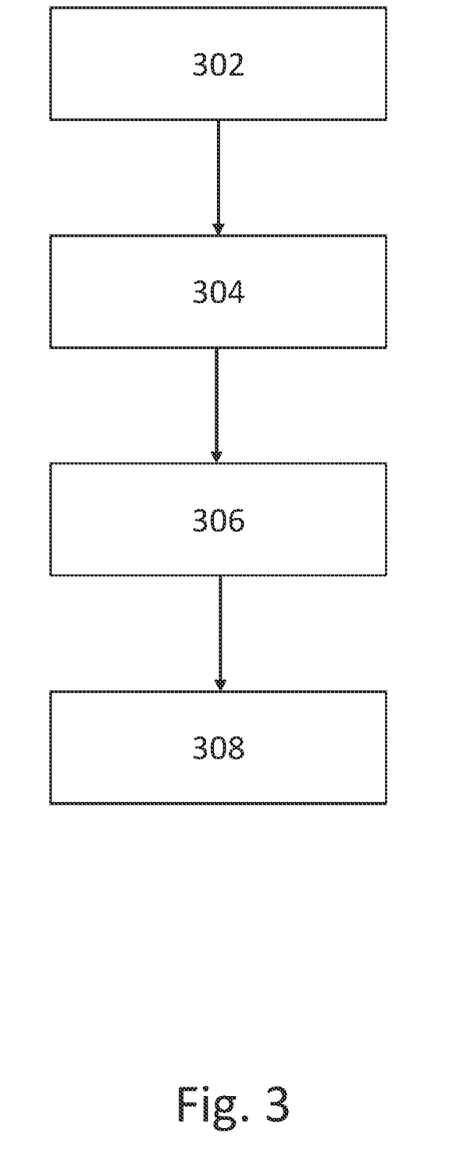
FIG. 3 is a flow chart describing a method for digital resampling as described herein.

FIG. 3 shows a flowchart describing a method for digital resampling in a coherent optical communications receiver. At step 302, data samples are received. The data samples have been converted from an optical data input stream into a sampled data input stream comprising a plurality of data samples having a first sample rate. The sampled data input stream may have been treated by the signal pre-processing steps described above in relation to FIG. 2.

At step 304, whole samples are selected from the digital input signal in the time domain. The selection of the whole samples is determined by an integer pointer value which may be received from a pointer calculator. A sample selector receives, for example, N samples per clock cycle as an input, and the samples are placed into a buffer. The integer pointer value, or base pointer, $p_0(t)$, defines the first sample from the buffer which is to be extracted. The selected samples comprise at least as many samples as those received per clock cycle (at least N in this example), as will be explained further below.

At step 306 complex time shift values are generated for the selected whole data samples. The complex time shift values are generated based on a fractional pointer value received from a pointer calculator. The generation of the complex time shift values may comprise providing the fractional pointer value as an input to a lookup table. The pointer, comprising the integer and fractional parts, may be derived from the output of a digital loop filter, as will be further explained below.

Sub-sample interpolation is then performed on the selected samples by applying the complex time shift values to the selected whole samples (308). Applying the time shift values is done by multiplying the respective values by the selected samples, and this takes place in the frequency domain.

Figure 4:
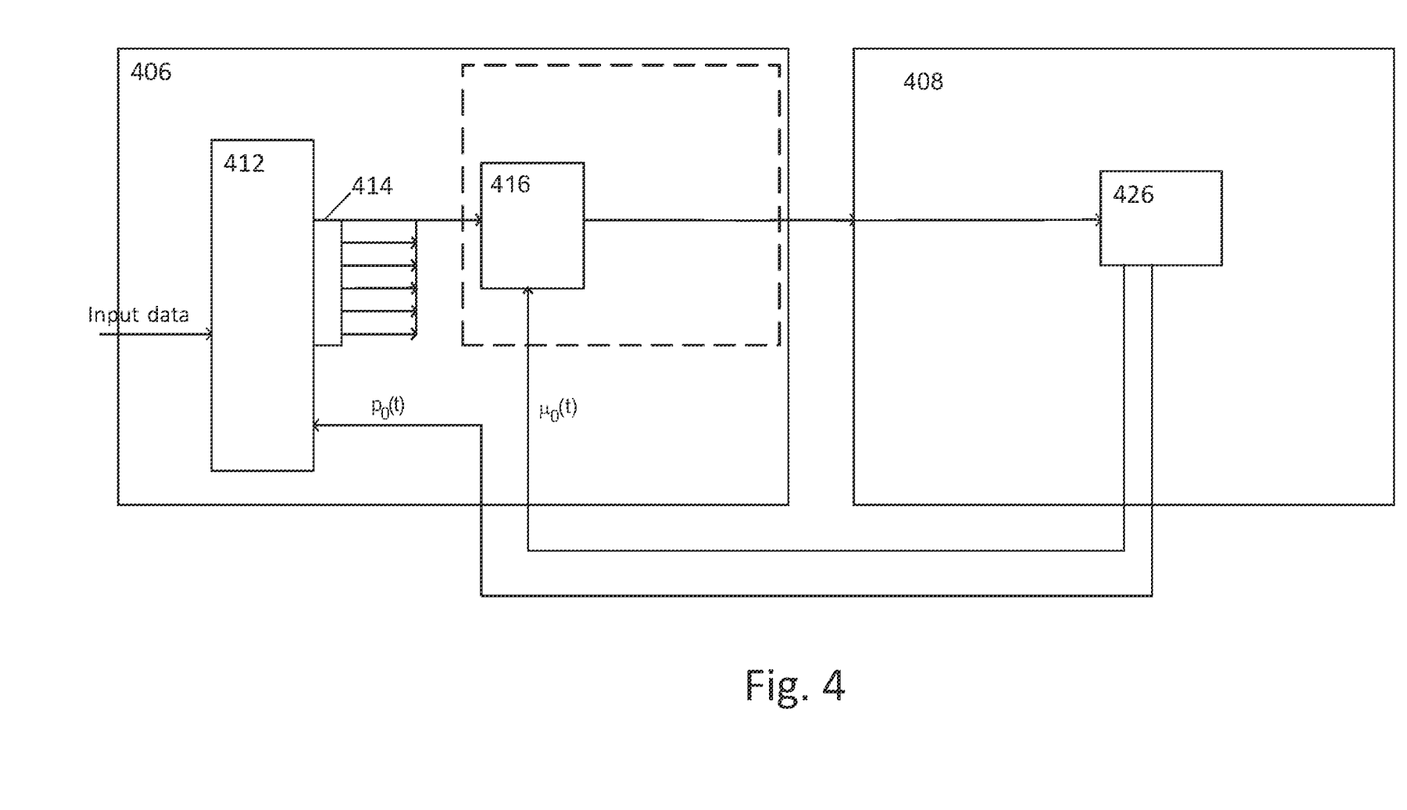
FIG. 4 is a block diagram illustrating a digital resampler and clock recovery module for performing the methods described herein.

FIG. 4 shows a block diagram of a resampler and clock recovery module 408, for performing a digital resampling method according to the present disclosure.

A resampler module 406 receives an input data signal as part of the digital signal processing at an optical data receiver modem. The input data signal is passed to a sample selector buffer 412. The length of the buffer may be determined by the amount of jitter which may affect the input data signal. As will be appreciated by the skilled person, higher order modulation formats leads to the use of longer interpolation filters to minimise any added distortion. As will be described further below, the number of samples extracted from the buffer may depend on a filter length, with a higher order filter leading to more samples being extracted. It will also depend upon the number of samples to be processed in a single step, using a frequency domain filter.

Sample selector 414 selects a predetermined number of samples from the sample selector buffer 412, using the integer part of the pointer (termed base pointer) and provides them to interpolator 416. The interpolator uses these samples in conjunction with the respective fractional part of the pointer (fractional pointer).

The resampler module 406 works in conjunction with clock recovery module 408. The clock recovery module 408 contains a timing phase detector which analyses the data, and detects any timing phase error. This error is used with a loop filter to adjust the desired timing phase—where the "Pointer Calculator" 426 reflects this by changing the output pointer with integer and fractional parts.

The particular selected samples which are to be taken from the sample selector buffer 412 are determined by the integer pointer value received at the sample selector from the pointer calculator. The integer pointer value, $p_0(t)$, may define the first sample in the buffer which is to be selected, of the predetermined number of samples. These samples are selected in the time domain. The integer pointer value $p_0(t)$ may be used to define another sample of the samples to be selected, such as the middle sample, or the final sample.

Interpolator 416 receives the selected whole samples from the sample selector 414, and converts them into the frequency domain. The interpolator receives the fractional part of the pointer from the pointer calculator 426, and generates complex time shift values for the selected samples. An example form which the shift values may take is that of a lookup table, having a predetermined number of values. In the example case where 64 values are to be generated, the following equation determines the complex time-shift values:

$$\exp\left(j2pi \cdot \mu \cdot \frac{[0:31, -32:-1]}{64}\right),$$

where $\mu$ is the fractional pointer value. Other techniques such as Cordic algorithms are also possible but incur more latency.

The interpolator 416 multiplies the complex time shift values with the respective frequency domain selected samples in order to cause sub-sample interpolation. This creates a set of interpolated signal samples, which may be further treated accordingly.

Performing interpolation in the frequency domain using complex time shift values derived from a fractional pointer is a more efficient method of interpolation than applying FIR filters in the time domain. This is somewhat counter-intuitive, because converting the signal into the frequency domain results in a processing of the signal, which places power demands in the signal path. However, frequency domain filtering is known to be efficient for block-wise processing, especially with filter length greater than 5 or 6 tap weights. In addition, as explained further below, the frequency domain interpolation may be opportunistically combined with an existing frequency filter for compensating polarisation effects.

The conversion of the selected samples into the frequency domain may be done using a Fast Fourier Transform (FFT) function. The FFT has a length N, and the output of the FFT (an FFT output) is multiplied by the N complex time shift values (complex valued numbers); that is to say, a shift generate module therefore generates one complex shift value for each frequency of the FFT).

In order to continue processing the signal in the time domain, an inverse FFT (IFFT) may be performed on the samples.

Figure 5:
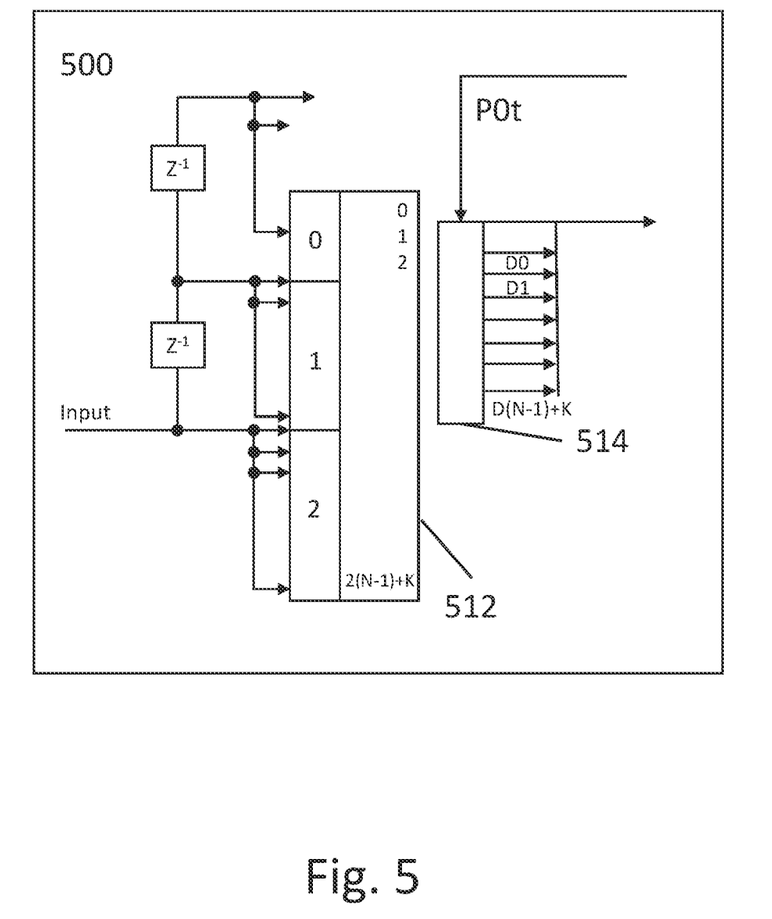
FIG. 5 is a block diagram of a sample selector for use as part of the method and digital resampler described herein

FIG. 5 shows a sample selector module 500 for use with the methods described herein. The sample selector module 500 comprises a sample bus 512 and a sample selector 514. Sample selector module 500 receives an input signal at a first sample rate. The first sample rate may be higher than that of the signal received by the optical receiver modem, in order to allow for compensation for channel distortions of the signal and to provide the bandwidth that will be used for interpolation. For example, the input signal be sampled at a sample rate of 4/3 samples/signal. The receiver as a whole may operate on a clock cycle of the sample rate divided by a fixed number of samples—for example 256 resulting in 256 samples being processed in parallel per clock cycle.

At each clock cycle interval, 256 new samples from the input data stream are placed in the buffer, in block 2. The previous clock cycle's ($Z^{-1}$) samples are moved to block 1. Longer buffers will result in several clock cycles being stored in the buffer (subsequent $Z^{-1}$ in FIG. 5). As mentioned above, the skilled person will appreciate that the sample buffer may be adapted to suit the system in which it is provided, and the values presented here are for illustration purposes. A longer or shorter buffer may be used within the scope of the present disclosure.

The sample selector 514 receives input pointer $p_o(t)$ from the pointer calculator. The $p_o(t)$ value received defines the first sample to be taken from the buffer. The sample selector 514 then takes a predetermined number of samples from the buffer using the defined first sample. Where the clock rate is sample rate/N, N samples may be taken. If further processing (for example filtering—described below) is to be carried out, N+K samples may be taken, where K is a predetermined number depending on the type of further processing or filtering to be carried out on the signal. The selected samples are then passed to an interpolation module for frequency domain sub sample interpolation.

If the system is functioning correctly, and the clock is operating with no offset, then the sample selector remains in the middle of the buffer. Where there is a frequency offset between the clock and the input signal, we would expect the sample selector to drift away from the centre. Where, for example, a sinusoidal jitter is present on the input signal, we would expect a similar sinusoidal effect on the sample selector as the clock rate lags or anticipates the jitter. It will be appreciated that the number of clock cycles' data which is stored in the buffer could include more than that shown in FIG. 5; for example, if one wanted to compensate for larger amounts of jitter, then a larger buffer would be used.

The frequency-based interpolation method described herein may be combined with upsampling where appropriate in the context of the optical receiver modem.

Figure 6:
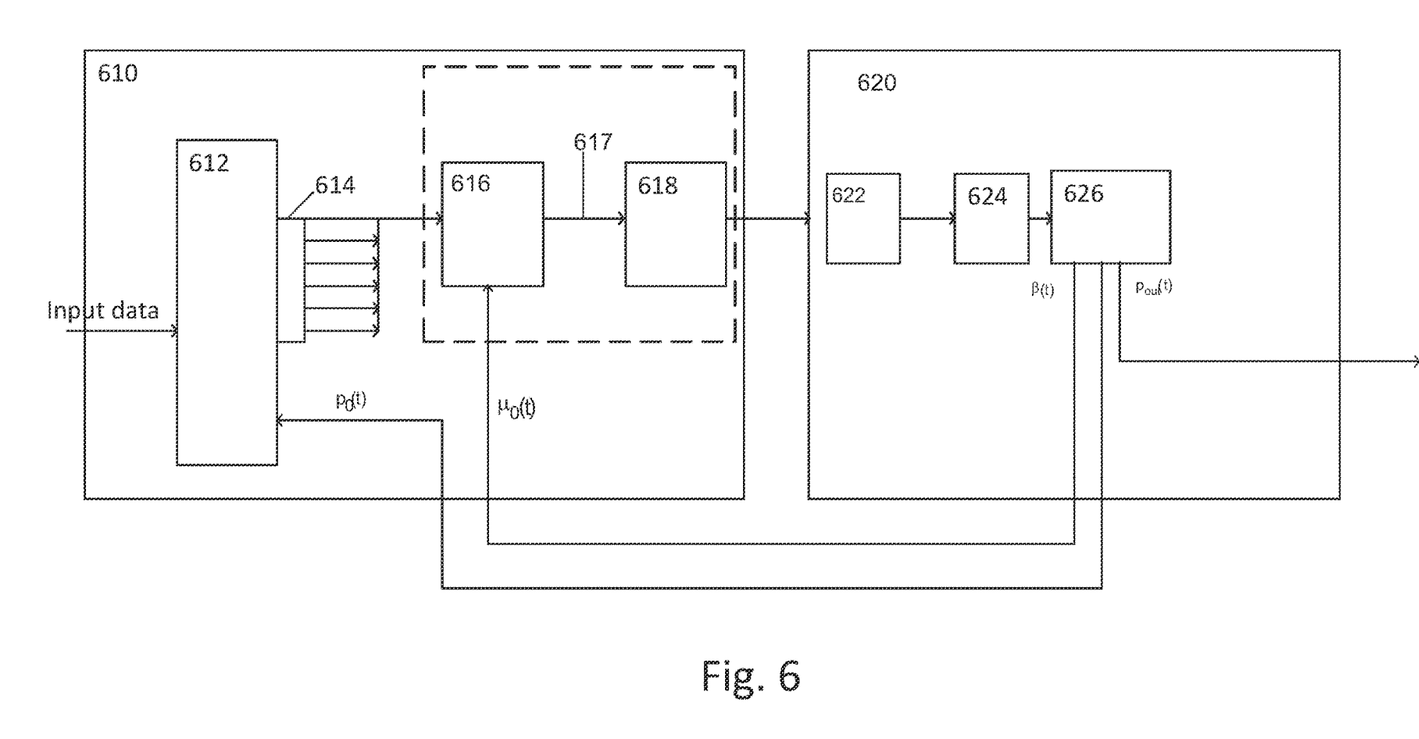
FIG. 6 is a block diagram illustrating digital resampler combined with a dynamic filter module, and clock recovery module as described herein.

FIG. 6 shows a simplified block diagram of a combined resampler and digital polarisation recovery filter 610 and clock recovery module 620. The polarisation-filter-plus-resampler is similar to that of the resampler of FIG. 4, but includes a polarisation filtering Multiple-input-multiple output (MIMO) filter module 618. The dashed line around interpolator 616 and filter module 618 indicates that the two functions may be combined. The interpolation carried out by interpolator 616 may take place in the frequency domain within the filter module. Sample selector 614 selects a predetermined number of samples from sample selector buffer 612. The interpolator 616 receives selected samples from sample selector 614 and passes retimed data 617 through the filter module 618 which performs the dynamic filter functionality. This is described in more detail below.

The combined resampler and digital recovery filter 610 receives integer pointer $p_o(t)$ and fractional pointer $\mu_o(t)$ from pointer calculator 626. Clock recovery module 620 comprises timing phase detector 622 and a digital loop filter 624. The timing phase detector 622 determines a timing phase error of the data at the output of the polarisation filter+resampler, which ideally is zero. The phase information is extracted from the different data streams (XI, XQ, YI, YQ).

The pointer calculator 626 generates the integer and fractional output pointers to remove the timing phase error. A common fractional pointer $\mu_o(t)$ may be used for all interpolators.

The pointer calculator 626 is also used to generate a phase detector value that can be used to control the ADC VCO. As the output pointer moves away from the centre of the sample selector buffer 612, the Pointer Calculator compensates by changing the rate of the receiver's data receive clock (ADC ref clock), via a VCO loop filter (not shown).

The phase and frequency of the resampling carried out is dependent upon a resampling ratio γ. In an example, there is a modest frequency offset to be compensated such that γ≈1 and the residual error β=γ−1≈0. A digital loop filter 624, containing proportional and integral filters, takes the current phase error from the timing phase detector, and generates a control signal for the pointer calculator such that the phase error will be reduced.

The dynamic filtering carried out in the resampler shown in FIG. 6 may incorporate an overlap and save method. The overlap and save method is a frequency domain implementation of the FIR filters which are described above. The filter will be implemented in the frequency domain using the overlap and save method. A block of input data is concatenated with the last input block and converted to the frequency domain (FFT). The data is then multiplied by frequency domain taps $\overline{H}$, which compensate for polarization effects and perform matched filtering. $\overline{H}$ is a matrix of complex valued tap-weight vectors received from a tap-update module delivered from a tap update module, where $$\overline{H} = \begin{pmatrix} \overline{H}xx & \overline{H}xy \\ \overline{H}yx & \overline{H}yy \end{pmatrix}$$

where $H_{xx}$, $H_{yx}$ are the taps for the x polarization, and $H_{xy}$, $H_{yy}$ represent the taps for the y-polarisation.

The data is then converted back to the time-domain (typically using IFFT). Finally, the first part of the output block is discarded.

In both frequency and time-domain implementations care must be taken to align input data and any error signal.

If we wish to implement the equivalent of an N-tap FIR filter, that is to say, an FIR filter with N coefficients, in the frequency domain, we take the samples for clock cycle (e.g. 256 samples) plus N−1 additional samples. An FFT is then performed on these samples, which are then multiplied by frequency domain tap weight values. An inverse Fourier transform (IFFT) is then performed to bring the signal back into the time domain. The N−1 samples are then discarded from the output of the IFFT, and the output is concatenated with the data from the previous clock cycle, to produce the filtered output signal.

The sample selection for the filter modes described may be achieved using the sample selector shown in FIG. 5. In an example case, the sample selector 514 has a length 256+K samples, where K is equal to the number of taps in the filter minus 1. In the case where, for example, a 21 tap filter is implemented, sample selector 514 outputs 276 samples (256+20). The buffer itself is significantly longer to take account of timing jitter that is to be compensated. It will be apparent to the skilled person that the foregoing figures are modifiable according to the requirements and specification of the receiver modem or other system in which the sample selector is implemented.

Figure 7:
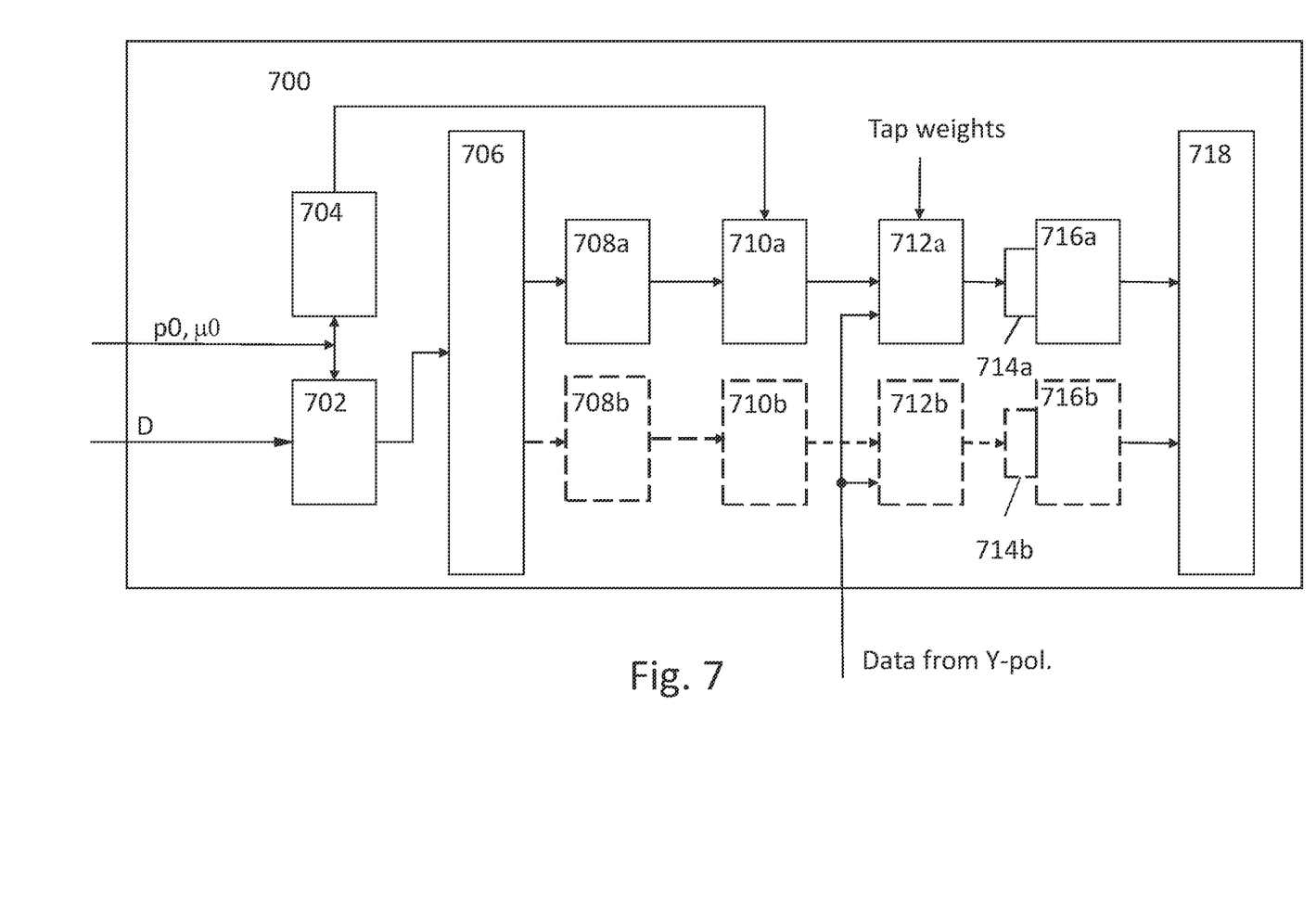
FIG. 7 is a block diagram of part of a combined polarisation filter and resampler as described herein.

FIG. 7 shows a combined polarisation filter and resampler (DFIL) 700. Input data is received at DFIL 700, and is passed to sample selector 702. The input data may comprise X and Y polarised Data [I, Q], at a first sample rate, for example 256 samples/clk. Sample selector 702 also receives the integer part of a pointer value received from a pointer calculator (not shown) as described in the foregoing. The sample selector 702 operates in the way described above with reference to FIGS. 5 and 6. The selected samples, based on the integer pointer value $p_0(t)$, are passed to the "data sort-in" module 706.

Generate shifts module 704 receives the fractional part of the pointer value from the pointer calculator. Generate shifts module 704 is arranged to output a set of complex time shift values in the form s(0, ... N−1). This may be in the form of a Lookup table (LUT). The lookup table can effectively be hardwired into the circuitry of the generate shifts module. The output from the generate shifts module can change every clock cycle, since it is dependent on the fractional pointer value, which may be updated every clock cycle.

The base pointer and fractional pointer are treated coherently—that is they are the integer and fractional parts of a single variable. The fractional pointer may be buffered before the generate shifts module 704 so as to account for any latency in the FFT and sample selector modules.

Data sort-in module 706 sorts the samples and distributes them for conversion into the frequency domain. The output of data sorting module is provided to one or more FFT modules (708a, 708b, ... ). The number of signal paths depends on the requirements of the system. An example is given below. The FFT module(s) 708a/708b produces an output with length N (i.e. the same length as the lookup table of complex time shift values). The output of the FFT is a data array of the form d(0, ... N−1).

The complex time shift values are applied to the output of the FFT modules 708a and 708b at time shift modules 710a and 710b. The time-shift block is a set of complex multiplications.

The output of the time shift module is then passed to the polarisation filter modules (POLs) 712a and 712b. The POL(s) 712a/712b is (are) used to compensate for time-varying and polarisation dependent effects such as PMD etc. described above. It also removes residual chromatic dispersion and acts as a matched filter.

The sample-selector module and digital interpolator associated with the resampler are also implemented within the polarisation filter, the sample-selector being performed in the time-domain, and the interpolation and polarisation filtering together in the frequency domain.

Figure 8:
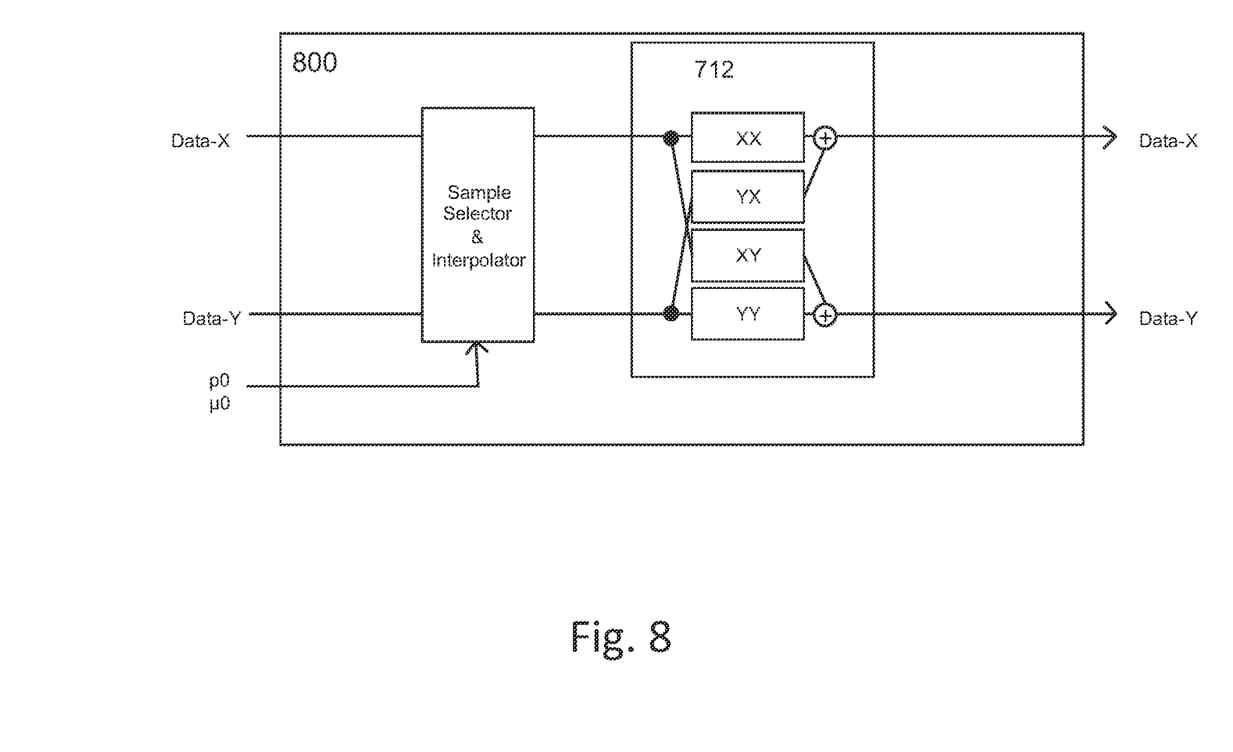
FIG. 8 is a block diagram of a combined polarisation filter and resampler as described herein.

The POL(s) 712a/712b may include a MIMO filter consisting of 4 complex valued, frequency domain filters arranged in a butterfly structure as can be seen in FIG. 8. FIG. 8 shows an abstraction of the combined POL 712 and resampler according to the present disclosure. In overview, X and Y polarized data, Data-X and Data-Y are received, and the functional processes outlined above are performed on each of them. In POL 712, X and Y frequency domain data are exchanged and multiplied by the frequency domain compensation response Hx=[Hxx Hxy] for the x polarization filter and Hy=[Hyy Hyx] for the y polarization filter, such that the result is $$[Hxx\ Hxy]\begin{bmatrix}X\\Y\end{bmatrix} \text{ and } [Hyy\ Hyx]\begin{bmatrix}Y\\X\end{bmatrix}$$

respectively. In the presented implementation, this is performed in one or more sub-filters, each with 64 frequency points.

At the output of the POL(s) 712a/712b the data is converted back into the time domain via an inverse FFT (IFFT) module(s) 716a/716b. Pad modules 714a and 714b are provided. The pad module(s) 714a/714b insert(s) zero values at the centre of the IFFT function. The length of the IFFT is different to that of the FFT, and in this way the input sample rate may be upsampled (or downsampled) to provide the resample function. For example, an FFT-64 and IFFT-96 may be used, which provides a 3/2x upsampling. In an example receiver having an input sample rate of 4/3 samples/symbol, the combined polarisation filter-plus-resampler and interpolator outputs at 2 samples/symbol.

The time-domain output of the IFFT module(s) 716a, 716b is passed to "data sort-out" module 718 and output to the clock recovery module. The sample rate of the input data to the clock recovery module is different to the sample rate of the data at the input of the resampler-polarisation filter and timing error has been corrected.

DFIL 700, 800 comprises parallel sub-filter paths (a) (b) and may include as many as required by the system requirements outlined in the foregoing. In an exemplary embodiment 6 parallel sub-filter paths may be provided and the POL+resampler may operate in a 21 tap mode.

As described above, the samples selected by sample selector are distributed between the FFT filters and resorted at the output.

The following table shows an example distribution of data samples to the sub-filter signal paths where six sub-filters are used.

TABLE 1

| | Bus mapping Bus Extension K =20 | | | | | | |
|---|---|---|---|---|---|---|---|
| FFT no. | Input:: start | Input:: stop | IFFT no. | IFFT:: start | IFFT:: stop | Output:: start | Output:: stop |
| FFT64 [0] | 0 | 63 | IFFT96 [0] | 15 | 80 | 0 | 65 |
| FFT64 [1] | 44 | 107 | IFFT96 [1] | 15 | 80 | 66 | 131 |
| FFT64 [2] | 88 | 151 | IFFT96 [2] | 15 | 80 | 132 | 197 |
| FFT64 [3] | 132 | 195 | IFFT96 [3] | 15 | 80 | 198 | 263 |
| FFT64 [4] | 176 | 239 | IFFT96 [4] | 15 | 80 | 264 | 329 |
| FFT64 [5] | 212 | 275 | IFFT96 [5] | 27 | 80 | 330 | 383 |

It can be seen that the data sorting module provides the sample overlap (20 samples) used to implement an overlap and save method used by the POL+resampler in a 21 tap mode.

The complex shift values are applied to the samples in each of the active sub-filter paths, as outlined in the foregoing; the same complex shift values may be applied to each of the sub-filter paths. The fractional pointer, µ0(t) value may have 7 input bits in order that the system is able to remove jitter at the order of 0.01 UI—where 1 UI is the width between adjacent eye openings on a conventional "eye diagram" of the input signal.

The foregoing describes a combined POL+resampler. This combination provides a more efficient method for removing jitter in a signal processed by a coherent optical communications receiver. By performing the interpolation function in the frequency domain, an increase in the length of filter is achieved, for the same amount of processing.

The 21 tap mode described above, with 6 sub filters operating through FFT modules having length 64, uses 3072 real multipliers to perform the interpolation on two polarisations of the X,Y polarised signal. A known time-domain based FIR interpolator system having 6 taps uses the same complexity of system (i.e. 3072 multipliers in the 6-tap filtering process). This means that the frequency domain-based interpolation carried out by the present system achieves greater precision in jitter removal, for the same processing power used by a time domain based interpolation having fewer taps.

The present system also uses existing components in an optical communications receiver, in the DFIL implementation which already uses an FFT/IFFT combination to perform the dynamic filtering, thereby achieving further efficiency without adding further signal processing and therefore latency into the signal path.

Figure 9:
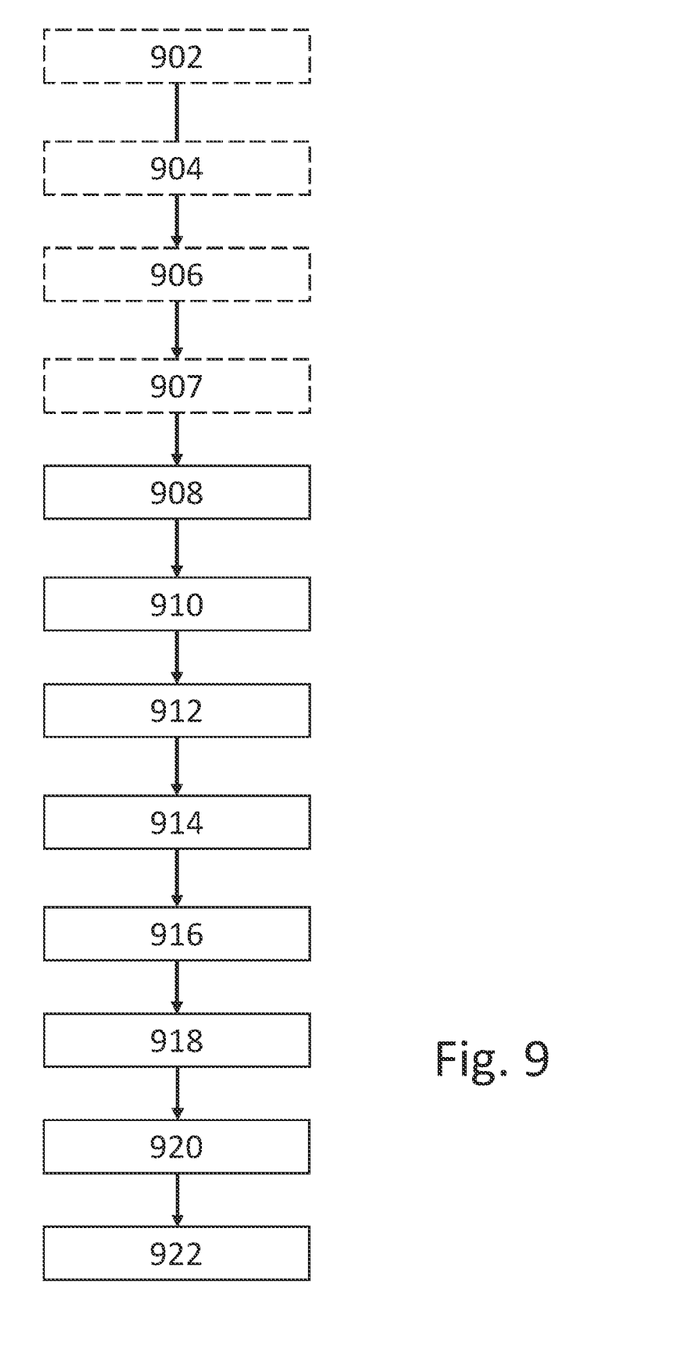
FIG. 9 is a flow chart describing a method for combined digital resampling and dynamic filtering of an input signal as described herein.

FIG. 9 describes the steps of a method for digital resampling in a coherent optical communications receiver. The digital resampling takes place in a Dynamic polarisation recovery filter module (DFIL) and combines sub sample interpolation with the features of the DFIL's dynamic filter functions. The steps in the figure comprising dashed lines are part of the function of the optical communications receiver, and are not necessarily part of the method. They are provided for background and context. At step 902 an optical signal is received at the receiver. At step 904 the optical signal is converted to an electrical signal at a transceiver module provided at the receiver. The received optical signal may be a modulated signal according to a known modulation scheme, such as those described above. The electrical signal is converted to a digital signal having a first sample rate at step 906. This is performed by an ADC. Prefiltering of the signal may take place at step 907. At step 908, whole samples are selected from the digital input signal in the time domain. The samples are selected based on an integer pointer which is generated by a pointer calculator. The number of whole samples selected may be dependent on an internal clock rate, the amount of distortion in the input signal (and therefore amount/frequency of jitter to be removed) and the modulation scheme of the input signal. Complex time shift values are generated at step 910. The complex shift values are generated based on the fractional part of the pointer generated by the pointer calculator. The selected whole samples are divided among one or more sub-filter signal paths at step 912. The dividing of the samples is done such that each sub filter path comprises samples present in another sub-filter signal path, in order that filtering according to the overlap- and save method may be used. Steps 914 to 920 are applied to each of the sub-filter signal paths. At step 914 an FFT is performed on the samples in each respective sub-filter signal path to convert them to the frequency domain. The complex time shift values are applied to the frequency domain samples at step 916, and this provides sub sample interpolation of the signal, being a time shift in the frequency domain. The time shifted samples are then filtered at step 918 using the feedback loops described above. The filtered signals are passed through an IFFT at step 920 to bring them back into the time domain. The IFFT has a different length to that of the FFT. This can be achieved by padding a certain amount of the centre of the IFFT with zeros—for example, where an FFT-64 is used, and IFFT-96 can be used, with the centre 32 samples set to zero. This modifies the sample rate of the signal to a second sample rate. At 922 the data from the sub-filters is recompiled.

For ease of explanation, the steps of FIG. 9 have been indicated as being performed sequentially. However, as the skilled person would understand, these steps may be performed continuously, in parallel and/or in real-time.

An effect of the present disclosure is the performing of more complex filtering of an input signal than in previous coherent optical communications receiver modems, without the associated and expected increase in signal processing.

It should be understood that, in the present disclosure, the verb 'to operate' may be used to mean 'to execute' or 'to run'.

Those skilled in the art will recognise that a wide variety of modifications, alterations, and combinations can be made with respect to the above described examples without departing from the scope of the disclosed concepts, and that such modifications, alterations, and combinations are to be viewed as being within the ambit of the disclosed concepts.

Those skilled in the art will also recognise that the scope of the invention is not limited by the examples described herein, but is instead defined by the appended claims.

The approaches described herein may be embodied on a computer-readable medium, which may be a non-transitory computer-readable medium. The computer-readable medium carries computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

In one form, a method for digital resampling in a coherent optical communications receiver, the coherent optical communications receiver being adapted to convert an optical data input stream into a digital input signal comprising a plurality of data samples at a first sample rate, is provided. The method comprises: selecting whole samples from the digital input signal in a time domain based upon an integer pointer value, to provide selected whole samples; generating complex time shift values for the selected whole samples based upon a fractional pointer value; and creating interpolated signal samples by applying the complex time shift values in a frequency domain to the selected whole samples to perform a sub-sample interpolation of the selected whole samples.

In one example, generating the complex time shift values comprises providing the fractional pointer value to an input of a lookup table. In a further example, an output of the lookup table comprises N complex valued numbers in a form s(0, . . . N−1); the method further comprising: performing a Fast Fourier Transform (FFT) on the selected whole samples to create an FFT output, wherein the FFT has a length N and the FFT output is a data array having values of a form d(0, . . . N−1). In a still further example, applying the complex time shift values comprises multiplying the complex valued numbers by respective output values of the data array in order to perform the sub-sample interpolation.

In one example, the fractional pointer value and the integer pointer value are updated at each clock cycle of the coherent optical communications receiver. In a further example, the method further comprises performing an inverse FFT on the interpolated signal samples.

In one example, the integer pointer value and the fractional pointer value are derived from an output of a digital loop filter.

In one example, the integer pointer value defines a first sample of the selected whole samples.

In one example, the method is performed in a dynamic polarisation recovery filter module. In a further example, the method further comprises modifying the first sample rate to a second sample rate, wherein modifying the first sample rate comprises: performing an FFT on the selected whole samples; performing one or more dynamic filter functions; and performing an inverse FFT (IFFT), wherein the FFT and the IFFT have different lengths. In a still further example, the one or more dynamic filter functions includes multiplying, in a multiple in multiple out filter, the selected whole samples by respective frequency domain tap weight values.

In another form, an optical communications receiver is provided. The optical communications receiver comprises: an analogue-to-digital converter (ADC), the ADC being adapted to convert an analogue data stream derived from an optical data input to produce a digital input signal comprising a plurality of data samples at a first sample rate; and a digital signal processor adapted to: select whole samples from the digital input signal in a time domain using an integer pointer value, to provide selected whole samples; generate complex time shift values for the selected whole samples using a fractional pointer value; and apply the complex time shift values in a frequency domain to the selected whole samples thereby causing a sub-sample interpolation.

In another form, one or more non-transitory computer readable storage media are provided. The one or more non-transitory computer readable storage media are encoded with instructions that, when executed by a processor of a coherent optical communications receiver adapted to convert an optical data input stream into a digital input signal comprising a plurality of data samples at a first sample rate, cause the processor to: select whole samples from the digital input signal in a time domain using an integer pointer value, to provide selected whole samples; generate complex time shift values for the selected whole samples using a fractional pointer value; and apply the complex time shift values in a frequency domain to the selected whole samples thereby causing a sub-sample interpolation.

What is claimed is:

1. A method for digital resampling in a coherent optical communications receiver, the coherent optical communications receiver being adapted to convert an optical data input stream into a digital input signal comprising a plurality of data samples at a first sample rate, the method comprising:
   selecting whole samples from the digital input signal in a time domain to provide selected whole samples;
   generating complex time shift values for the selected whole samples; and
   applying the complex time shift values in a frequency domain to the selected whole samples.

2. The method of claim 1, where generating the complex time shift values comprises providing a fractional pointer value to an input of a lookup table.

3. The method of claim 2, wherein an output of the lookup table comprises N complex valued numbers in a form s(0, . . . N−1); the method further comprising:
   performing a Fast Fourier Transform (FFT) on the selected whole samples to create an FFT output, wherein the FFT has a length N and the FFT output is a data array having values of a form d(0, . . . N−1).

4. The method of claim 3, wherein applying the complex time shift values comprises multiplying the complex valued numbers by respective output values of the data array in order to perform a sub-sample interpolation.

5. The method of claim 1, wherein a fractional pointer value and an integer pointer value are updated at each clock cycle of the coherent optical communications receiver.

6. The method of claim 5, wherein the method further comprises performing an inverse FFT on interpolated signal samples created by the applying.

7. The method of claim 1, wherein:
   selecting the whole samples includes selecting the whole samples based upon an integer pointer value; and
   generating the complex time shift values includes generating the complex time shift values based upon a fractional pointer value, and wherein the integer pointer value and the fractional pointer value are derived from an output of a digital loop filter.

8. The method of claim 1, wherein an integer pointer value defines a first sample of the selected whole samples.

9. The method of claim 1, wherein the method is performed in a dynamic polarisation recovery filter module.

10. The method of claim 9, further comprising modifying the first sample rate to a second sample rate, wherein modifying the first sample rate comprises:
    performing an FFT on the selected whole samples;
    performing one or more dynamic filter functions; and
    performing an inverse FFT (IFFT), wherein the FFT and the IFFT have different lengths.

11. The method of claim 10, wherein the one or more dynamic filter functions includes multiplying, in a multiple in multiple out filter, the selected whole samples by respective frequency domain tap weight values.

12. An optical communications receiver comprising:
    an analogue-to-digital converter (ADC), the ADC being adapted to convert an analogue data stream derived from an optical data input to produce a digital input signal comprising a plurality of data samples at a first sample rate; and
    a digital signal processor adapted to:
       select whole samples from the digital input signal in a time domain to provide selected whole samples;
       generate complex time shift values for the selected whole samples; and
       apply the complex time shift values in a frequency domain to the selected whole samples.

13. The optical communications receiver of claim 12, wherein the digital signal processor comprises a dynamic polarisation recovery filter module, and wherein the digital signal processor is arranged to generate the complex time shift values and apply the complex time shift values in the dynamic polarisation recovery filter module.

14. The optical communications receiver of claim 12, wherein the digital signal processor is further adapted to:
    provide a fractional pointer value to an input of a lookup table.

15. The optical communications receiver of claim 14, wherein an output of the lookup table comprises N complex valued numbers in a form $s(0, \ldots N-1)$, and wherein the digital signal processor is further adapted to:
  perform a Fast Fourier Transform (FFT) on the selected whole samples to create an FFT output, wherein the FFT has a length N and the FFT output is a data array having values of a form $d(0, \ldots N-1)$.

16. The optical communications receiver of claim 15, wherein the digital signal processor is further adapted to:
  multiply the complex valued numbers by respective output values of the data array, in order to perform sub-sample interpolation.

17. One or more non-transitory computer readable storage media encoded with instructions that, when executed by a processor of a coherent optical communications receiver adapted to convert an optical data input stream into a digital input signal comprising a plurality of data samples at a first sample rate, cause the processor to:
  select whole samples from the digital input signal in a time domain to provide selected whole samples;
  generate complex time shift values for the selected whole samples; and
  apply the complex time shift values in a frequency domain to the selected whole samples.

18. The one or more non-transitory computer readable storage media of claim 17, wherein the instructions that cause the processor to generate the complex time shift values include instructions that cause the processor to provide a fractional pointer value to an input of a lookup table.

19. The one or more non-transitory computer readable storage media of claim 18, wherein an output of the lookup table comprises N complex valued numbers in a form $s(0, \ldots N-1)$, and wherein the instructions further cause the processor to:
  perform a Fast Fourier Transform (FFT) on the selected whole samples to create an FFT output, wherein the FFT has a length N and the FFT output is a data array having values of a form $d(0, \ldots N-1)$.

20. The one or more non-transitory computer readable storage media of claim 19, wherein the instructions that cause the processor to apply the complex time shift values include instructions that cause the processor to multiply the complex valued numbers by respective output values of the data array, in order to perform sub-sample interpolation.

* * * * *